(12) United States Patent
Lindemann (10) Patent No.: US 8,528,727 B2
(45) Date of Patent: Sep. 10, 2013

(54) SHAFT-HUB ASSEMBLY WITH EXPANSION ELEMENT

(75) Inventor: Harry Lindemann, Wermelskirchen (DE)

(73) Assignee: Interroll Holding AG (CH)

( * ) Notice: Subject to any disclaimer, the term of this patent is extended or adjusted under 35 U.S.C. 154(b) by 442 days.

(21) Appl. No.: 12/664,606

(22) PCT Filed: Jun. 9, 2008

(86) PCT No.: PCT/EP2008/004591
§ 371 (c)(1),
(2), (4) Date: Dec. 14, 2009

(87) PCT Pub. No.: WO2008/155042
PCT Pub. Date: Dec. 24, 2008

(65) Prior Publication Data
US 2010/0230250 A1    Sep. 16, 2010

(30) Foreign Application Priority Data
Jun. 18, 2007    (DE) .......................... 10 2007 027 934

(51) Int. Cl.
*B65G 23/04*    (2006.01)
(52) U.S. Cl.
CPC ...................................... *B65G 23/04* (2013.01)
USPC ....................................................... 198/835
(58) Field of Classification Search
USPC ................ 198/835, 842; 193/37; 403/259.5, 403/355, 356, 372, 376
See application file for complete search history.

(56) References Cited

U.S. PATENT DOCUMENTS

| | | | | |
|---|---|---|---|---|
| 1,083,697 A | * | 1/1914 | Neptune | 403/274 |
| 2,625,415 A | * | 1/1953 | Smith | 403/289 |
| 2,739,615 A | * | 3/1956 | Wurzel | 285/223 |
| 3,007,726 A | * | 11/1961 | Parkin | 403/372 |
| 3,161,125 A | * | 12/1964 | Hornbostel | 100/155 R |
| 3,527,120 A | * | 9/1970 | Duer et al. | 475/235 |
| 3,773,360 A | * | 11/1973 | Timbers | 285/307 |
| 4,136,982 A | | 1/1979 | Sagady | |

(Continued)

FOREIGN PATENT DOCUMENTS

| | | |
|---|---|---|
| DE | 28 46 103 | 5/1979 |
| DE | 33 08 262 | 10/1984 |

(Continued)

*Primary Examiner* — Gene Crawford
*Assistant Examiner* — William R Harp
(74) *Attorney, Agent, or Firm* — Gerald E. Hespos; Michael J. Porco; Matthew T. Hespos (57) ABSTRACT

A conveying system has a roller and a shaft-hub assembly with a kingpin (81), an expansion element (83) and a hub (82). The kingpin has a cross-section corresponding to a cross-section of the hub so that the kingpin is fixed radially to the hub. The kingpin (81) is fixed rotationally to the hub (82). The expansion element in a relaxed state, has an external diameter that exceeds the internal diameter of the hub. The expansion element also is deformed elastically when the kingpin is disposed in the hub so that the external peripheral region (831) of the expansion element shifts from the relaxed position. Axial displacement of the external peripheral region of the expansion element is coupled with a reduction in the external diameter so that the reduced external diameter of the expansion element corresponds to the internal diameter of the corresponding internal peripheral region of the hub.

15 Claims, 6 Drawing Sheets

(56) References Cited

U.S. PATENT DOCUMENTS

| | | | |
|---|---|---|---|
| 4,225,036 A * | 9/1980 | Michael | 198/840 |
| 4,396,110 A * | 8/1983 | Christensen | 198/576 |
| 5,370,587 A * | 12/1994 | Johnson et al. | 474/166 |
| 5,527,126 A * | 6/1996 | Digel et al. | 403/359.6 |
| 5,603,532 A * | 2/1997 | Guest | 285/305 |
| 5,720,530 A * | 2/1998 | Holsnijders et al. | 301/105.1 |
| 5,720,685 A * | 2/1998 | Malone | 474/190 |
| 5,816,627 A * | 10/1998 | Readman | 285/340 |
| 6,109,427 A * | 8/2000 | Hosch et al. | 198/835 |
| 6,361,261 B1 * | 3/2002 | Gattone et al. | 411/526 |
| 6,422,382 B1 | 7/2002 | Ertel et al. | |
| 6,783,314 B2 * | 8/2004 | Gattone | 411/533 |
| 6,905,280 B2 * | 6/2005 | Brunner et al. | 403/358 |

FOREIGN PATENT DOCUMENTS

| | | |
|---|---|---|
| DE | 36 22 312 | 1/1989 |
| DE | 38 42 905 | 6/1990 |
| DE | 199 00 134 | 7/1999 |
| DE | 695 15 319 | 10/2000 |
| DE | 102 17 221 | 4/2005 |
| GB | 744 614 | 2/1956 |
| GB | 858 931 | 1/1961 |

* cited by examiner

SHAFT-HUB ASSEMBLY WITH EXPANSION ELEMENT

BACKGROUND OF THE INVENTION

1. Field of the Invention

The invention relates to a conveying system with a conveyor roller comprising a shaft-hub assembly, such a conveyor and such a shaft-hub assembly.

2. Description of the Related Art

Drift conveyors, such as conveyor belts, usually have a plurality of conveyor rollers rotatably supported in a frame of the drift conveyor. Some of these conveyor rollers have an antifriction bearing in the interior of the roller for the rotatable support of the conveyor roller. In other designs, an antifriction bearing is arranged on the frame of the drift conveyor, and the conveyor rollers only have an axle neck, which is supported in the antifriction bearing.

Such rollers are mass-produced articles so that even slight improvements in the manufacture of the conveyor rollers would lead to considerable economies of scale.

In directly or indirectly (such as via a conveyor belt) driven conveyor rollers, moreover, the gap between the stationary frame and the rotating conveyor roller is a danger spot.

A possibility for supporting a conveyor roller which also contributes to removing the danger spot is disclosed, for example, in German Patent Specification DE 33 08 262 C1. In this document, a conveyor roller is disclosed wherein the drum shell axially projects beyond an axle. The conveyor roller is supported in a bearing profile via a block-like bearing element, which protrudes into the projecting drum shell. By these means, the gap between the stationary and rotating parts is covered by the projecting drum shell. In the conveyor roller shown, the axle is welded into a circular metal sheet part having a central hole, and the metal sheet part, in turn, is welded into the drum shell.

The manufacture of such a conveyor roller involves a relatively large amount of work and cost.

It is an object of the present invention to provide a conveying system having a conveyor roller, such a conveyor roller and a design for a shaft-hub assembly, by which such a conveyor roller can be supported, which ensures reliable support and is easy to manufacture. It is a further object of the present invention to provide such a conveying system having a conveyor belt, in which the danger spot between the conveyor roller and neighboring stationary parts has been removed.

SUMMARY OF THE INVENTION

One aspect of the invention relates to a shaft-hub assembly comprising a axle pin, an expansion element and a hub, wherein the axle pin has an axle region with an axle cross-section, essentially corresponding to a hub cross-section of a corresponding hub region of the hub, in such a manner that the axle pin partially or fully disposed in the hub, can be fixed in the radial direction relative to the hub, wherein the axle pin has an axle rotation locking region and the hub has a hub rotation locking region, wherein the axle rotation locking region and the hub rotation locking region are constructed in such a way that the axle pin disposed in the hub is fixed to prevent rotation in the circumferential direction relative to the hub, and wherein the expansion element is disposed on the axle pin, has an outer peripheral region and is configured in such a manner that the outer peripheral region, in the relaxed state of the expansion element, has an outer diameter, which is larger than an inner diameter of a corresponding inner peripheral region of the hub, wherein the expansion element, when the axle pin is arranged within the hub, is elastically deformed in such a manner, that the outer peripheral region of the expansion element is displaced from the relaxed position of the expansion element in the axial direction of the axle pin and wherein a reduction of the outer diameter of the outer peripheral region of the expansion element is coupled with the axial displacement of the outer peripheral region of the expansion element in such a manner that the reduced outer diameter of the expansion element corresponds to the inner diameter of the corresponding inner peripheral region of the hub against which it is in pre-stressed contact.

The axle region and the hub region preferably have an essentially cylindrical configuration, which means that the corresponding surfaces can essentially be described as surfaces which are each created by the parallel displacement of a line extending parallel to the axis of the axle pin along any closed curve in space. By these means it is ensured that the axle region and the hub region can be easily pushed one into the other during assembly. The two regions are particularly easy to manufacture if they have an essentially circular-cylindrical cross-section. Cross-sectional shapes deviating from the circular-cylindrical shape have the advantage, however, that they simultaneously realize the function of the axle rotation locking region or the hub rotation locking region without having to press the hub and the axle pin one into the other or without having to provide additional components. The axial displacement of the outer peripheral region, which is coupled to a reduction of the outer diameter, describes a combined movement of the outer diameter having an axial component and a radial component. The displacement in the axial direction runs against the direction of insertion of the axle pin into the hub. By means of such movement extending at an oblique angle to the axis of the axle pin, fixing of the axle pin is effected in the hub. The terms shaft, hub and axle pin in the form used here refer to components transmitting torques as well as components that do not transmit a torque.

A further advantageous embodiment relates to such a shaft-hub assembly, wherein the expansion element and the corresponding inner peripheral region of the hub are constructed in such a manner that due to the coefficient of friction between the expansion element and the inner peripheral region and due to a displacement angle between the displaced areas of the expansion element, at the radial ends of which the outer peripheral region of the expansion element is disposed, and the inner peripheral region of the expansion element, a self-locking effect of the expansion element is created in the hub. The displaced areas of the expansion element can be preferably formed, for example, as finger-like extensions, wherein their ends form the outer peripheral area and wherein the sides of the finger-like extensions, which are opposite to the outer peripheral region, are attached on an expansion element base. Such a finger-like extension is deformed in the context of the elastic deformation essentially in the area of the point of attachment on the expansion element base, so that the remaining portion of the finger-like extension is pivoted as a displaced area of the expansion element by the displacement angle in an essentially undeformed state. Herein, the region of the finger-like extension which is referred to as the outer peripheral region, carries out the described combined movement in the axial and radial directions. The term self-locking means that, as a force is applied to the axial pin in the axial direction against an introduction direction of the axle pin, a normal force resulting from this force is created between the outer peripheral region of the expansion element and the inner peripheral region of the hub, which, taking the coefficient of friction between the outer peripheral region of the expansion element and the inner peripheral region of the hub into consideration, results in a frictional force which is greater than the force applied to the axle pin in the axial direction against the introduction direction of the axle pin (not taking the frictional force into account which is created by the spring force of the expansion element). By means of this configuration, the axle pin together with the expansion element can be pushed into the hub and is fixed in the inserted position in the hub in a direction against the introduction direction. Alternatively or additionally, fixing can be effected by selecting the material pairing between the material of the expansion element and the material of the hub in such a manner that the outer peripheral region of the expansion element can penetrate the surface of the inner peripheral region of the hub during expansion, so that the self-locking effect is replaced or reinforced by an interlocking engagement. Herein, the outer peripheral region of the expansion element is preferably formed with a sharp edge in such a manner that penetration into the surface of the inner peripheral region of the hub is facilitated.

Furthermore, an embodiment of the shaft-hub assembly is preferred, wherein the expansion element is configured as a disk or preferably as a closed ring, wherein the expansion element has slots spaced in the circumferential direction, which extend from the outer peripheral region essentially radially in such a manner toward the inside, that the outer peripheral region is formed by the ends of a number of finger-like extensions mutually separated in the circumferential direction by slots. Herein, the expansion element preferably configured as a closed ring can have, for example, the basic shape of a washer, having slots directed from the outside toward the inside. Such a slotted washer has a substantially planar configuration in the relaxed state. It is also conceivable that the expansion element already has a plate-like basic shape in the relaxed state, wherein the plate edge has a substantially conical form. Such a configuration facilitates the insertion of the axle pin together with the expansion element into the hub. Preferably, in both cases, the slots essentially extend radially from the outside toward the inside or have an essentially V-shaped configuration. Other slot forms, such as recesses spiraling towards the inside, are also conceivable.

Another advantageous embodiment relates to a shaft-hub assembly, wherein the expansion element is preferably arranged on the axle pin, preferably on an axial end of the axle pin, and/or is attached on the axle pin by riveting, welding, screwing or any other attachment type. Herein, the attachment is realized in such a manner that the expansion element preferably has no axial play, but preferably has a radial play. A radial play has the advantageous effect that the expansion element can expand independently of a precise rotation-symmetrical arrangement with respect to the axis of the axle pin, in a uniform manner during insertion into the hub. In this way, double fitting is avoided.

Preferably such a shaft-hub assembly has a configuration wherein the axle pin area of the axle pin, which is received within the hub, has an essentially circular-cylindrically form and wherein the diameter of the axle pin region and a diameter of a corresponding hub receiving region of the hub form a sliding fit, a slight press fit or a press fit, which comprise, for example, the H7-g8 or H7-p8 fits. The circular-cylindrical shape is particularly easy and therefore cost-effective to make. A sliding fit is particularly easily assembled. Due to the expansion element, an interference fit is not necessary to fix the axle pin within the hub. A slight press fit can be advantageous, however, if no or only small torques are to be transmitted since in this case an interlocking engagement, which is costly to make, can be avoided by means of a slight press fit.

Furthermore, such a shaft-hub assembly is preferred, wherein the diameter of the hub is essentially the same across the entire insertion length of the axle pin. In this embodiment, the axle region or the hub region is at least partially identical with the axle rotation locking region and the hub rotation locking region. Herein, a rotation lock is preferably achieved by means of a press fit.

A further advantageous embodiment relates to such a shaft-hub assembly, wherein a rotation locking region between the axle pin and the hub is formed as an interlocking engagement region. Preferably, such an interlocking engagement region is achieved by a feather key arranged as a separate element in a keyway of the axle pin and in a keyway of the hub. Other forms of interlocking engagement, such as a non-rotation symmetrical configuration of the corresponding cross-sections of the axle pin and the hub, for example, in the form of a spline profile, are also conceivable.

Furthermore, a configuration of a shaft-hub assembly is preferred, wherein the expansion element is made of steel. Preferably, the expansion element is of hardened spring steel. Due to the hardness of spring steel, the expansion element can easily expand into the softer materials of the hub. Herein, the hub can be of non-hardened steel, aluminum or plastic material, for example, or can include such materials. With softer materials, such as plastic material or aluminum, it can suffice if the expansion element is of non-hardened steel or another metal, since these materials of the expansion element can also have sufficient elasticity and hardness with respect to their respective hub material. Other materials are also conceivable, which have sufficient elasticity and hardness.

Furthermore, such a shaft-hub assembly has preferably a configuration, wherein the hub is made of an aluminum alloy. Aluminum or an aluminum alloy has the advantage that this material is easily manufactured, for example, by means of continuous casting, or can be easily extruded. Herein, it is possible to make the hub together with a drum shell and any struts required between them in one processing step.

A further aspect of the invention relates to a conveyor roller for a conveying system, which includes an above-described shaft-hub assembly.

Another aspect of the invention relates to a conveying system comprising such a conveyor roller.

Furthermore, an embodiment of the conveying system is preferred, wherein the conveying system is formed as a belt conveying system and has a conveyor belt that is at least partially wrapped around the conveyor roller.

A further advantageous embodiment relates to a conveyor system, wherein the conveyor roller at least on one side is supported in a bearing cup having a radius which, at least in an angle of wrap of the conveyor belt, is essentially equal to or slightly smaller than the radius of the conveyor roller in the axial end region of the conveyor roller, wherein the conveyor belt is wider than the length of the conveyor roller in the axial direction, and wherein the conveyor belt is arranged on the conveyor roller in such a manner that the gap between the conveyor roller and the bearing cup is covered by the conveyor belt. The angle of wrap depends on the degree of redirecting of the conveyor belt on the conveyor roller. If the conveyor roller is used as a return roller at the end of a conveyor belt, the angle of wrap can be 180° or more. In the case of a conveyor roller which is used between the ends of a conveyor belt, the angle of wrap can be just a point on the circumference in cross-section, or can be in the form of a line extending in the longitudinal direction of the conveyor roller. The bearing cup is used to mount the conveyor roller in a frame of the conveyor system. Herein, the gap which would arise between the frame and the conveyor roller in conventional bearings is displaced toward the roller center of the conveyor roller. Surprisingly, it has become apparent that depending on the configuration of the conveyor cup, or the conveyor roller, the relative movement between the conveyor belt, which is carried across the surface of the conveyor cup in a sliding manner, does not lead to undesirable wearing of the conveyor belt. This can be explained by the fact that, in particular with a larger diameter of the conveyor roller in the roller end region of the conveyor roller with respect to the diameter of the bearing cup, the belt tension is negligible in the region of the bearing cup. This effect can also be seen if the radius of the bearing cup in the region of wrap is essentially equal to the radius of the conveyor roller in the roller end region, if the conveyor roller has a crowned configuration, that is it has a greater diameter in the center region of the roller than in the roller end region. Independently of the configuration of the radii or diameters of the bearing cup and the conveyor roller, wear phenomena can be reduced or even eliminated also by a particularly smooth surface finish of the bearing cup and/or a suitable choice of materials for the bearing cup and the conveyor belt. Preferably, the bearing cup is made of steel. Herein, the conveyor roller is supported by one bearing cup on each of both sides.

Preferably, such a conveying system has a configuration, wherein the bearing cup, in the angle of wrap, has a radius smaller by between 0.3 mm and 2.5 mm than the radius of the conveyor roller in the axial end region of the conveyer roller.

Furthermore, such a conveying system is preferred, wherein the bearing cup, in the angle of wrap, has a roughness depth of, for example, Ra 3.2 or Ra 6.3, wherein the roughness height of Ra 6.3 is particularly preferred.

Another advantageous embodiment relates to such a conveying system, wherein the conveyor roller has a crowned configuration, wherein the roller center diameter in the central region of the conveyor roller is between 1 mm and 2 mm, more preferably about 1.5 mm, larger than the roller end diameter of the conveyor roller in a roller end region. The term roller end region refers to the region of the axial ends of the conveyor roller. The term crowned as used in the present case, comprises both a rounded convex configuration of the surface and a preferred configuration, wherein the conveyor roller has two essentially conical regions, which flair beginning from the roller end regions to the center of the conveyor roller and are joined in the central region of the roller by an essentially circular-cylindrical region, wherein the axial length of each of the three regions preferably essentially corresponds to a third of the roller length.

Furthermore, a configuration of a conveying system is preferred, wherein at least one bearing on which the conveyor roller is rotatably supported, is received in the bearing cup. Herein, the conveyor roller is preferably supported on both sides by a self-aligning ball bearing in a bearing cup on each side.

Furthermore, such a conveying system has preferably a configuration, wherein the conveyor roller is rotatably supported by a axle pin that is arranged on the conveyor roller in a manner resistant against rotation and axial displacement and has a bearing region projecting beyond the roller end region of the conveyor roller in the axial direction and has a bearing diameter corresponding to an inner bearing ring of the antifriction bearing in this region.

Individual, particularly preferred embodiments of the invention will be described in the following in an exemplary manner. The individually described embodiments in part have features that are not absolutely necessary for implementation of the present invention, but that are generally deemed advantageous. Thus, embodiments which do not have all the features of the embodiments described in the following will also be considered as falling under the teachings of the invention. It is also conceivable to selectively combine features described with reference to different embodiments.

BRIEF DESCRIPTION OF THE DRAWINGS

FIG. 6b shows detail A of FIG. 6a.

DETAILED DESCRIPTION OF THE PREFERRED EMBODIMENT

Figure 1:
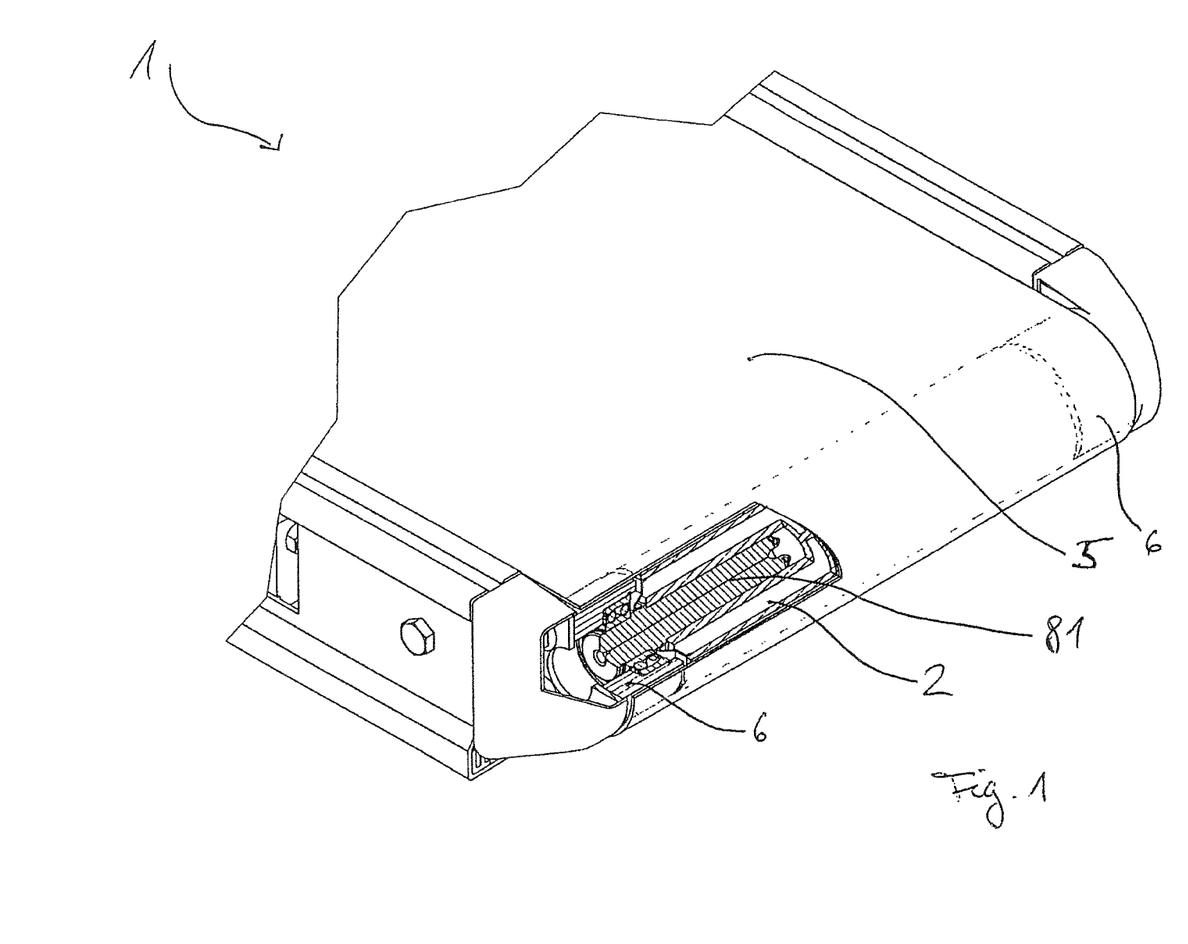
FIG. 1 shows an isometric view of a conveyor system in a partial cutaway view.

FIG. 1 is an isometric view of a conveyor system 1 in a partial-sectional view.

Conveyor system 1 is formed as a belt conveyor. FIG. 1 shows the return region of a conveyor belt 5 redirected by 180° via a conveyor roller 2. Conveyor belt 5 is thus in contact with conveyor roller 2 with an angle of wrap of about 180°.

Conveyor roller 2 is rotatably supported between two bearing cups 6. Bearing cups 6 are fixed on a frame in a rotation-resistant manner. In operation, conveyor roller 2 thus rotates relative to bearing cups 6 or relative to the frame of conveyor system 1.

To support conveyor roller 2, a bearing 61 is provided in each of stationary bearing cups 6, configured as an antifriction bearing, in particular a self-adjusting ball bearing in the present embodiment. Herein, conveyor roller 2 is supported by one axle pin 81 in each of bearings 61.

Figure 2:
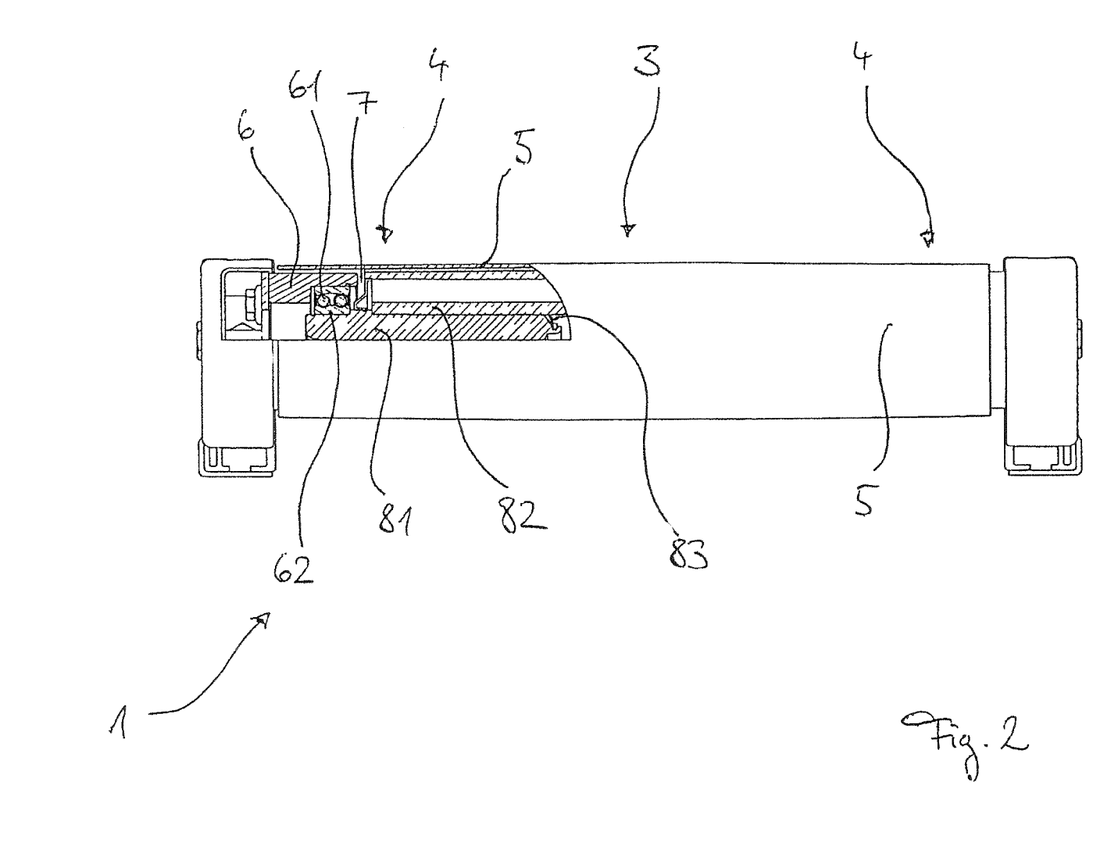
FIG. 2 shows the conveyor system of FIG. 1 in a front view in a partial-sectional view.
Figure 3:
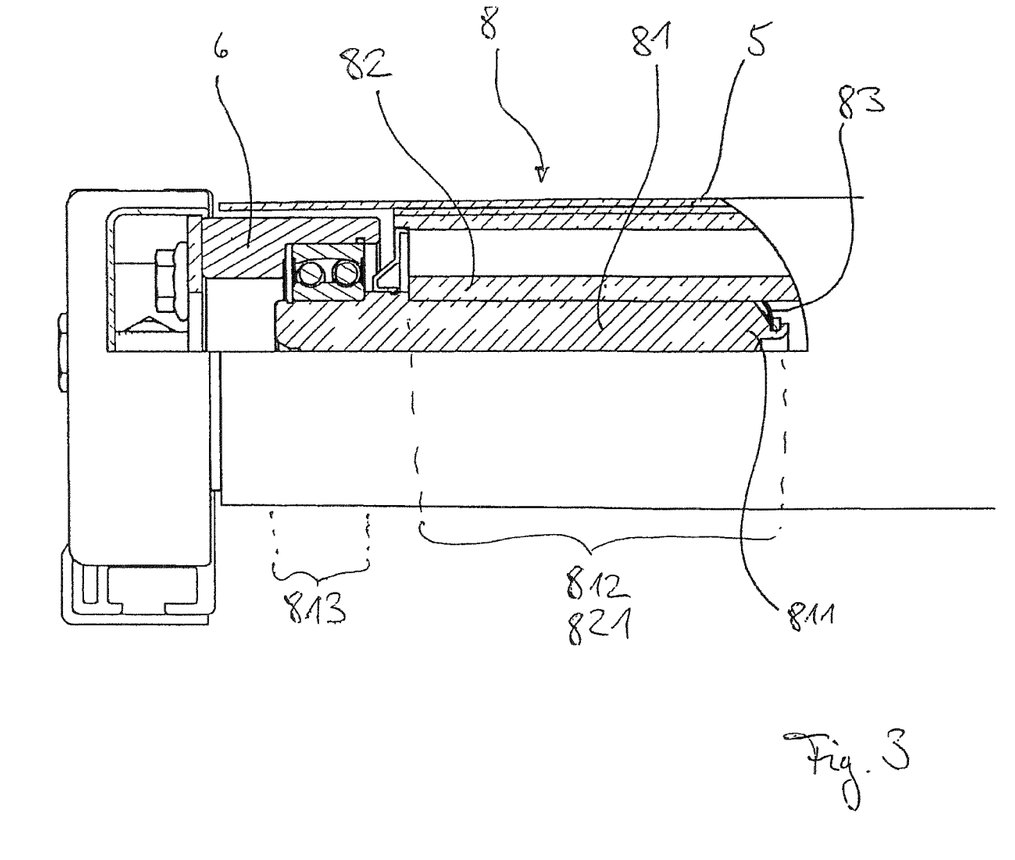
FIG. 3 is an enlarged view of the conveyor system of FIG. 2.

FIG. 2 shows conveyor system 1 of FIG. 1 in a front view in partial cross-section, and FIG. 3 shows an enlarged view of conveyor system 1 of FIG. 2. Each of the figures shows the same embodiment of preferred conveyor system 1. This is why the same reference numerals will be used for each of the same parts.

FIG. 3 shows axle pin 81 in a partial cross-section of conveyor system 1. It can be seen that axle pin 81 has a axle pin region 812 received in a hub receiving region 821 of a hub 82. In the preferred embodiment shown, axle pin region 812 is formed as an essentially circular-cylindrical body and is inserted in the hub receiving region 821 of hub 82 also formed as a circular-cylindrical hole. Herein, the tolerances of hub receiving region 821 and axle pin region 812 are dimensioned as a slight press fit. To ensure secure fitting of axle pin 81 within hub 82, an expansion element 83 is provided in an axial end 811 of axle pin 81, which preferably ensures a release-secure connection between axle pin 81 and conveyor roller 2.

Figure 4:
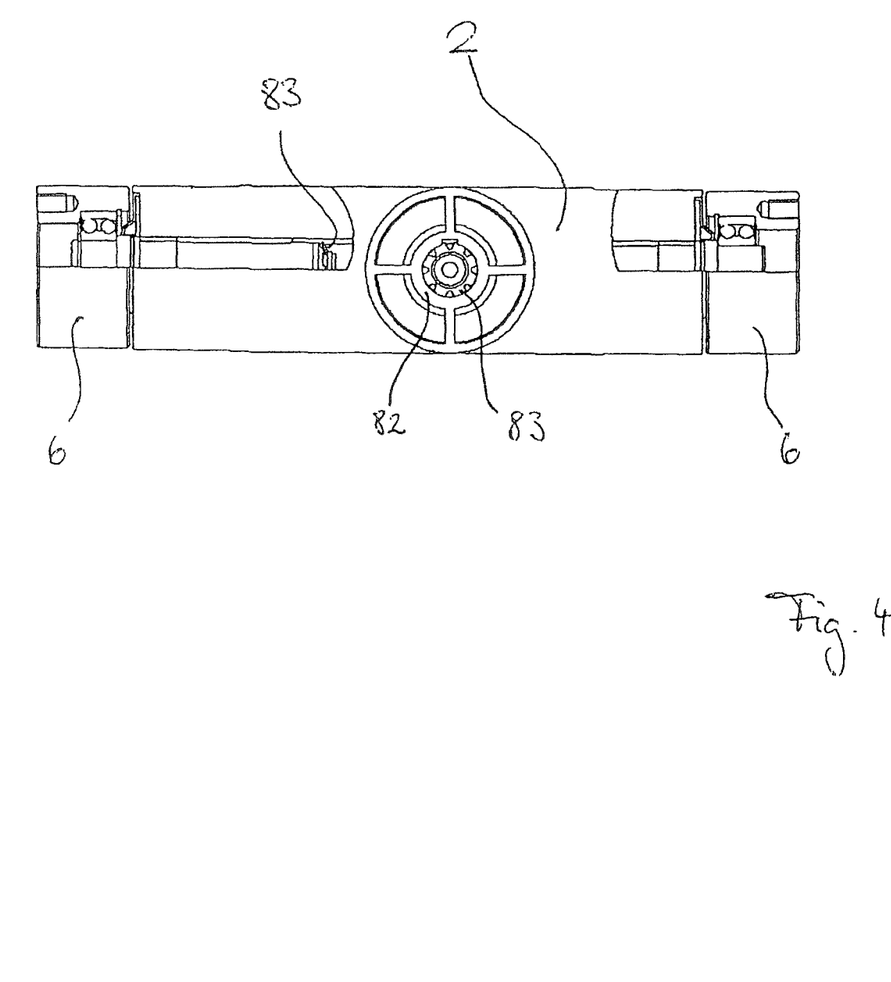
FIG. 4 shows an assembly of the conveyor system having two bearing cups and a bearing roller with cutaway regions and a cross-sectional view of the conveyor roller.

The cross-section of the preferred conveyor roller 2 is shown in FIG. 4.

FIG. 4 shows an assembly of conveyor system 1 having two bearing cups 6 and a conveyor roller 2 with cutaway portions and a cross-sectional view of conveyor roller 2.

It is shown in FIG. 4 that hub 82, a conveyor roller shell of conveyor roller 2 and connecting webs between hub 82 and the conveyor roller shell are integrally formed. The manufacture of such a conveyor roller 2 can be carried out, for example, in the continuous casting method. A preferred material for conveyor roller 2 is aluminum or an aluminum alloy. It is also conceivable to manufacture conveyor roller 2 in any other form, such as assembled of several parts. A conveyor roller 2 manufactured in the continuous casting method has essentially the same cross-section over the entire length of conveyor roller 2. A crowned shape of conveyor roller 2, which is a preferred shape of conveyor roller 2, is preferably created in a processing step by later turning the shell surface of conveyor roller 2.

The crowned shape of conveyor roller 2 has the advantageous effect that a conveyor belt redirected or supported by conveyor roller 2 is centered and does not run off center from the conveyor roller in the axial direction. In the preferred embodiment having two bearing cups 6 in which conveyor roller 2 is rotatably supported, the crowned shape of conveyor roller 2 has the further advantage that the edge regions of conveyor belt 5 remain essentially stress free.

As can be seen from FIG. 3, bearing cup 6 has a slightly smaller diameter than adjacent roller end region 4 of conveyor roller 2. This configuration, in addition to the crowned shape of conveyor roller 2, contributes to a reduction of the friction between conveyor belt 5 and bearing cup 6.

In a particularly preferred embodiment, bearing cup 6, at least in the angle of wrap of conveyor belt 5, is provided with a smooth surface, so that any undesirable friction can be further reduced. A preferred roughness height, with which bearing cup 6 is provided at least in this region, is Ra 6.3.

As can also be seen from FIG. 3, axle pin 81, on the side opposite expansion element 83, is provided with a bearing region 813, which preferably also has a circular-cylindrical configuration and a diameter for forming a desired fit with bearing inner ring 62 of bearing 61. Herein, bearing region 813 is preferably formed as a fixed bearing on one side of conveyor roller 2 and as a loose bearing on the other side of conveyor roller 2.

Figure 5:
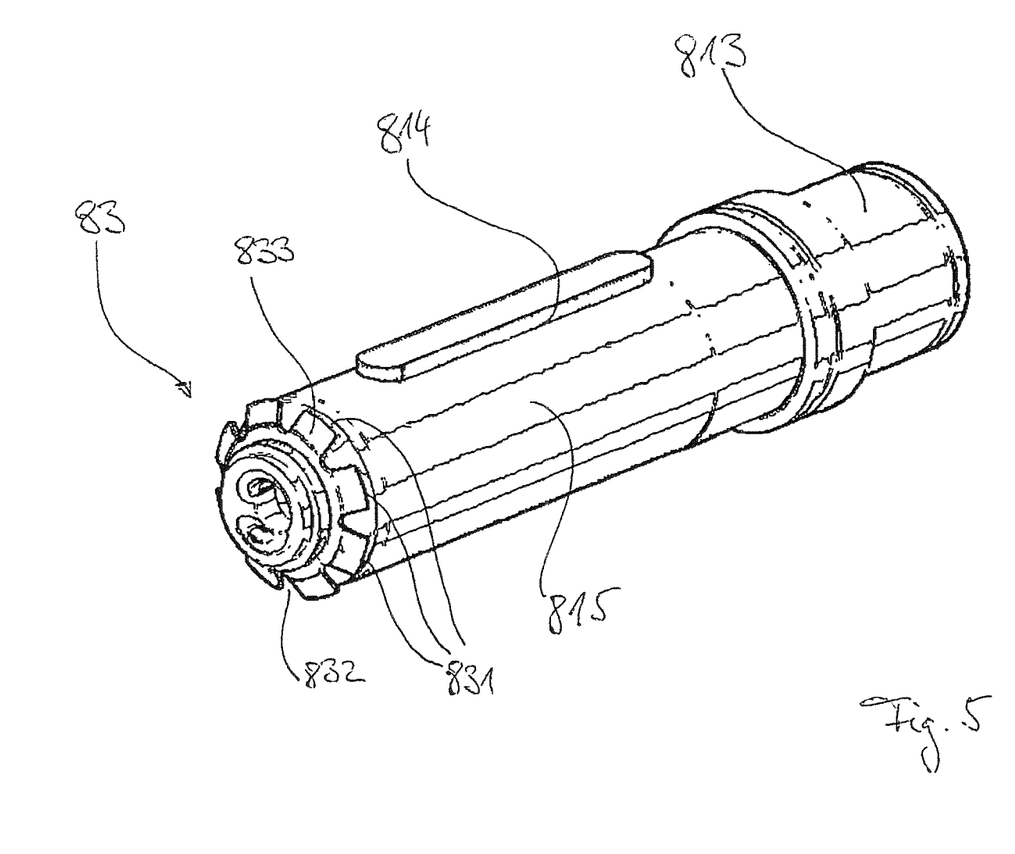
FIG. 5 is an isometric view of a axle pin with an expansion element arranged on it.

FIG. 5 is an isometric view of axle pin 81 with an expansion element 83 arranged thereon.

As can be clearly seen from this figure, an axle rotation locking region 814 is provided on axle pin 81 which, in the preferred embodiment shown, is formed by means of a keyway in axle pin 81, in which a feather key is inserted. In the embodiment shown it can be further seen, that, between bearing region 813 and axle region 815, a collar having a greater diameter is provided, which serves as a stop in both directions.

It is also conceivable, instead of a feather key, to provide a press fit between axle pin 81 and hub 82. Other embodiments are also conceivable, which ensure a rotation lock between hub 82 and axle pin 81. In particular, for non-driven conveyor rollers 2 or with conveyor rollers which only need to transmit a small torque, a slight press fit is sufficient, which can also be created between axle pin 81 and hub 82 which is preferably made of an aluminum alloy.

Expansion element 83 is arranged on an axial end 811 of axle pin 81. In the preferred embodiment shown, expansion element 83 is riveted onto axle pin 81. It is also conceivable to attach expansion element 83 on the axle pin in a different way, such as by means of screwing, welding, etc.

Figure 6A:
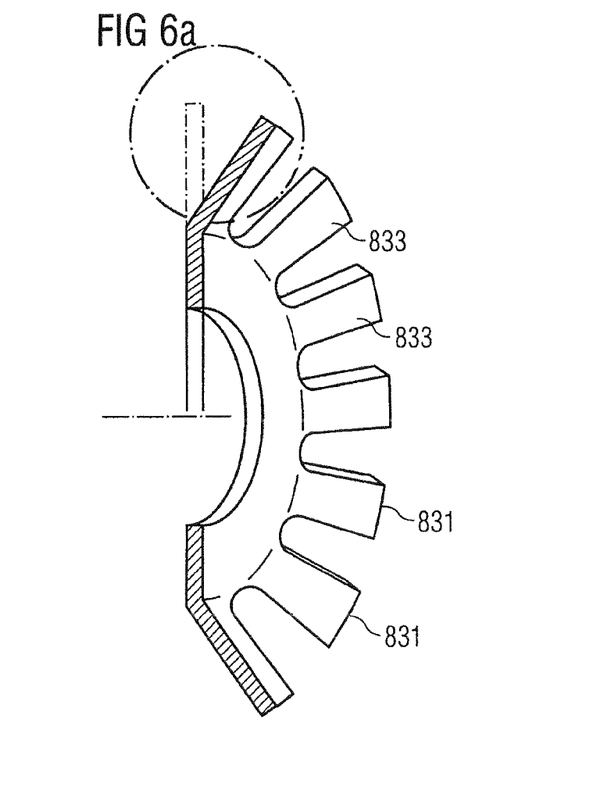
FIG. 6a is an isometric sectional view of the expansion element.

FIG. 6a is an isometric sectional view of a preferred expansion element 83, which is also shown in FIG. 5.

As shown in FIG. 6a, the basic form of preferred expansion element 83 essentially corresponds to the shape of a plate, wherein the edges of the plate have a conical configuration. In the center of expansion element 83, a hole is preferably disposed, through which a rivet or a screw can be passed for attachment.

In the preferred embodiment shown, expansion element 83 is formed as a closed ring about the hole, from which finger-like extensions 33 extend toward the outside in a radial direction. In other words, slots 832 extend from an outer peripheral region 831 of expansion element 83 toward the inside and subdivide the circumferential region into partial regions. Slots 832 can have a V-shaped configuration as shown in the preferred embodiment shown, and can extend essentially radially toward the inside. Other embodiments are also conceivable, wherein slots alternatively or additionally extend from the inside toward the outside, so that the ring essentially has a zig zag shape. It is also conceivable to configure the ring not as a closed ring but as a ring that is completely interrupted in one place and has two open ends.

In the preferred embodiment shown, slots 832 essentially extend from the outer peripheral region 831 to a fold formed between the plate edge and the planar plate surface, toward the inside. It is also conceivable that the slots further extend to the center of expansion element 83 or are made shorter.

Figure 6B:
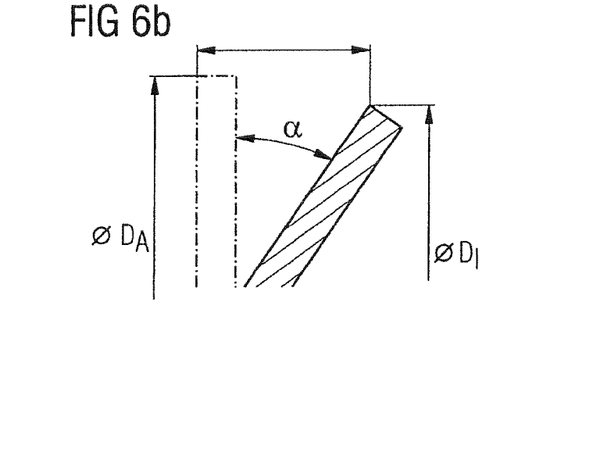

FIG. 6b shows a detail A of FIG. 6a.

In this figure, the position of finger-like extension 833 is shown in broken lines, in which the finger would be in a planar configuration of expansion element 83 in the relaxed state (in a fictive planar configuration). From this relaxed position, finger-like extension 833 can be displaced into the stressed position by an angle α, as is shown as a hatched area in FIG. 6b. In the preferred embodiment of plate-like expansion element 83, the relaxed position would be between the two positions shown. In both cases it can be seen that expansion element 83, in its relaxed position, has a diameter $D_I$, which corresponds to the diameter of the inner peripheral region of hub 82. Such a diameter $D_I$ can be in the range of 31.3 mm, for example. Furthermore, expansion element 83, in its relaxed state, has a diameter that is greater than diameter $D_I$. Such a diameter $D_A$ can be, for example, in the range of 31.7 mm.

As axle pin 81 is inserted into hub 82, finger-like extensions 833 are displaced and come into pre-stressed contact with the inner peripheral region of hub 82. The friction between outer peripheral region 831 of expansion element 83 and the inner peripheral region of hub 82 creates a frictional force that, if axle pin 81 should be pulled out of hub 82, finger-like extensions 833 are pushed toward their relaxed position. Concurrently with this force, the pressure between outer peripheral region 831 and the inner peripheral region of hub 82 is increased, since the reverse displacement into the relaxed positions would be concurrent with an increase in the diameter. By means of this configuration it is ensured that the frictional force between outer peripheral region 831 and the inner peripheral region of hub 82 is preferably always greater than the force exerted on axle pin 81.

This effect can be reinforced by giving outer peripheral region 831 a sharp edge, so that, in particular if the material of expansion element 83 is harder than the material of hub 82, outer peripheral region 831 can penetrate the inner peripheral region of hub 82. This effects, in addition to the frictional engagement, an interlocking engagement which creates a particularly strong anchoring effect of axle pin 81 within hub 82.

The invention claimed is:

1. A conveyor roller (2) for a conveying system (1), which includes a shaft-hub assembly (8) comprising an axle pin (81), an elastically deformable expansion element (83) and a hub (82), wherein the axle pin (81) has an axle region (815) with an axle cross-section essentially corresponding to a hub cross-section of a corresponding hub region of the hub (82) in such a manner that the axle pin (81) disposed in the hub (82) is fixed in the radial direction relative to the hub (82), wherein the axle pin (81) has an axle rotation locking region (814) and the hub (82) has a hub rotation locking region, wherein the axle rotation locking region (814) and the hub rotation locking region are configured in such a manner that the axle pin (81) disposed within the hub (82) is fixed against rotation in a circumferential direction relative to the hub (82), and wherein the expansion element (83) is arranged on an axial end of the axle pin (81) in such a manner that the expansion element has a radial play, wherein the expansion element (83) has a disk with a center hole so that a continuous ring is defined around the center hole, circumferentially spaced extensions (833) extending out from the continuous ring to an outer peripheral region (831) and the expansion element (83) being configured in such a manner that the outer peripheral region (831), in the relaxed state of the expansion element (83), has an outer diameter, which is larger than an inner diameter of a corresponding inner peripheral region of the hub (82), wherein the expansion element (83), when the axle pin (81) is arranged within the hub (82), is elastically deformed in such a manner that the outer peripheral region (831) of the expansion element (83) is displaced from the relaxed position of the expansion element (83) in the axial direction of the axle pin (81) and wherein a reduction of the outer diameter of the outer peripheral region (831) of the expansion element (83) is coupled with the axial displacement of the outer peripheral region (831) of the expansion element (83) in such a manner that the reduced outer diameter of the expansion element (83) corresponds to the inner diameter of the corresponding inner peripheral region of the hub (82) against which the outer peripheral region (831) of the expansion element (83) is in pre-stressed contact.

2. The conveyor roller (2) according to claim 1, wherein the expansion element (83) and the corresponding inner peripheral region of the hub (82) are configured in such a manner that due to the coefficient of friction between the expansion element (83) and the inner peripheral region and due to a displacement angle α between the displaced areas of the expansion element (83), at the radial ends of which the outer peripheral region (831) of the expansion element (83) is arranged, and the inner peripheral region of the expansion element (83) a self-locking effect of the expansion element (83) is created within the hub (82).

3. The conveyor roller (2) according to claim 2, wherein the diameter of the hub (82) is essentially the same over the entire insertion length of the axle pin (81).

4. The conveyor roller (2) according to claim 1, wherein the axle pin (81) has an axle pin region (812), which is received in the hub (82), has an essentially circular-cylindrical configuration, and wherein the diameter of the axle pin region (812) and a diameter of a corresponding hub receiving region of the hub (82) form a sliding fit, a slight press fit or a press fit.

5. The conveyor roller (2) according to claim 1, wherein the region between the axle rotation locking region (814) and the hub rotation locking region is configured as an interlocking engagement region.

6. The conveyor roller (2) according to claim 1, wherein the expansion element (83) is made of steel.

7. The conveyor roller (2) according to claim 1, wherein the hub (82) is made of an aluminum alloy.

8. A conveying system (1), which includes a conveyor roller (2) comprising an axle pin (81), an elastically deformable expansion element (83) and a hub (82), wherein the axle pin (81) has an axle region (815) with an axle cross-section essentially corresponding to a hub cross-section of a corresponding hub region of the hub (82) in such a manner that the axle pin (81) disposed in the hub (82) is fixed in the radial direction relative to the hub (82), wherein the axle pin (81) has an axle rotation locking region (814) and the hub (82) has a hub rotation locking region, wherein the axle rotation locking region (814) and the hub rotation locking region are configured in such a manner that the axle pin (81) disposed within the hub (82) is fixed against rotation in a circumferential direction relative to the hub (82), and wherein the expansion element (83) is arranged on an axial end of the axle pin (81) in such a manner that the expansion element has a radial play, wherein the expansion element (83) has a disk with a center hole so that a continuous ring is defined around the center hole, circumferentially spaced extensions (833) extending out from the continuous ring to an outer peripheral region (831) and the expansion element (83) being configured in such a manner that the outer peripheral region (831), in the relaxed state of the expansion element (83), has an outer diameter, which is larger than an inner diameter of a corresponding inner peripheral region of the hub (82), wherein the expansion element (83), when the axle pin (81) is arranged within the hub (82), is elastically deformed in such a manner that the outer peripheral region (831) of the expansion element (83) is displaced from the relaxed position of the expansion element (83) in the axial direction of the axle pin (81) and wherein a reduction of the outer diameter of the outer peripheral region (831) of the expansion element (83) is coupled with the axial displacement of the outer peripheral region (831) of the expansion element (83) in such a manner that the reduced outer diameter of the expansion element (83) corresponds to the inner diameter of the corresponding inner peripheral region of the hub (82) against which the outer peripheral region (831) of the expansion element (83) is in pre-stressed contact.

9. The conveying system (1) according to claim 8, wherein the conveying system (1) is configured as a belt conveying system and has a conveyor belt (5), which at least partially wraps around the conveyor roller (2).

10. The conveying system (1) according to claim 9, wherein the conveyor roller (2) is supported, at least on one side, in a bearing cup (6) having a radius which, at least in an angle of wrap of the conveyor belt (5), is essentially equal to or slightly smaller than the radius of the conveyor roller (2) in the axial end region of the conveyor roller (2), wherein the conveyor belt (5) is wider than the length of the conveyor roller (2) in the axial direction and wherein the conveyor belt (5) is arranged on the conveyor roller (2) in such a manner that the gap (7) between the conveyor roller (2) and the bearing cup (6) is covered by the conveyor belt (5).

11. The conveying system (1) according to claim 10, wherein the bearing cup (6), in the angle of wrap, has a radius smaller by between 0.3 mm and 2.5 mm than the radius of the conveyor roller (2) in the axial end region of the conveyor roller (2).

12. The conveying system (1) according to claim 10, wherein the bearing cup (6), in the angle of wrap, has a roughness height of Ra 3.2 or Ra 6.3.

13. The conveying system (1) according to claim 10, wherein the conveyor roller (2) has a crowned shape, wherein the roller center diameter in the roller center region (3) of the conveyor roller (2) is between 1 mm and 2 mm, preferably about 1.5 mm, larger than the roller end diameter of the conveyor roller (2) in a roller end region (4).

14. The conveying system (1) according to claim 10, wherein at least one bearing (61) on which the conveyor roller is rotatably supported is received in the bearing cup (6).

15. The conveying system (1) according to claim 14, wherein the axle pin (81), on the side opposite to the expansion element (83) in the axial direction, has a bearing region (813), which projects in the axial direction beyond the roller end region (4) of the conveyor roller (2), wherein the axle pin (81) has an antifriction bearing and has a bearing diameter in this region corresponding to the bearing inner ring (62) of the antifriction bearing.

* * * * *